(12) United States Patent
Strongo (10) Patent No.: US 12,049,523 B2
(45) Date of Patent: Jul. 30, 2024

(54) METHOD OF MANUFACTURING A BIODEGRADABLE HEALTHCARE PRODUCT

(71) Applicant: Charles Anthony Strongo, San Clemente, CA (US)

(72) Inventor: Charles Anthony Strongo, San Clemente, CA (US)

( * ) Notice: Subject to any disclaimer, the term of this patent is extended or adjusted under 35 U.S.C. 154(b) by 565 days.

(21) Appl. No.: 17/381,044

(22) Filed: Jul. 20, 2021

(65) Prior Publication Data

US 2022/0017644 A1    Jan. 20, 2022

Related U.S. Application Data

(60) Provisional application No. 63/054,139, filed on Jul. 20, 2020.

(51) Int. Cl.

| | | |
|---|---|---|
| *C08B 30/04* | (2006.01) | |
| *B29C 45/00* | (2006.01) | |
| *B29C 45/46* | (2006.01) | |
| *B29L 31/00* | (2006.01) | |
| *C08B 30/12* | (2006.01) | |
| *C08L 3/02* | (2006.01) | |

(52) U.S. Cl.
CPC ........ *C08B 30/048* (2013.01); *B29C 45/0001* (2013.01); *B29C 45/46* (2013.01); *C08B 30/044* (2013.01); *C08B 30/12* (2013.01); *C08L 3/02* (2013.01); *B29K 2003/00* (2013.01); *B29K 2995/006* (2013.01); *B29L 2031/753* (2013.01); *C08L 2201/06* (2013.01); *C08L 2203/02* (2013.01)

(58) Field of Classification Search
CPC ..... C08B 30/048; C08B 30/12; C08B 30/044; C08L 3/02; C08L 2203/02; C08L 2201/06; B29C 45/46; B29C 45/0001; B29K 2003/00; B29K 2995/006; B29L 2031/753

See application file for complete search history.

(56) References Cited

FOREIGN PATENT DOCUMENTS

| MX | 2012008962 | * | 2/2014 |
| WO | WO 2013/169174 | * | 11/2013 |

OTHER PUBLICATIONS

Machine English translation of MX 2012008962, Olvera, Feb. 25, 2014.*

* cited by examiner

*Primary Examiner* — Patrick D Niland (57) ABSTRACT

A method is provided of manufacturing a biodegradable healthcare product for environmental purposes such as reducing waste. The main ingredients include a quantity of potato starch, a quantity of corn starch, and a quantity of avocado seeds. The quantity of potato starch, the quantity of corn starch, and the quantity of avocado seeds are all pulverized. The quantity of potato starch, the quantity of corn starch, and the quantity of avocado seeds are amalgamated into a quantity of biodegradable powder. A molding process is executed by manufacturing a sterile healthcare product from the quantity of biodegradable powder. The sterile healthcare product can be any type of healthcare product such as, but not limited to, a pharmaceutical product bottle, a nutraceutical product bottle, a one test kit container, a band-aid container, a dental floss container, a swab container, a syringe, an inhaler, a dropper, or a tampon.

15 Claims, 10 Drawing Sheets

METHOD OF MANUFACTURING A BIODEGRADABLE HEALTHCARE PRODUCT

The current application claims a priority to the U.S. Provisional Patent application Ser. No. 63/054,139 filed on Jul. 20, 2020.

FIELD OF THE INVENTION

The present invention relates generally to manufacturing of healthcare products. More specifically, the present invention is a method of manufacturing a biodegradable healthcare product.

BACKGROUND OF THE INVENTION

Existing techniques for producing a healthcare product are deficient with regard to several aspects. For instance, current technology does not use biodegradable material for producing a healthcare product. Furthermore, current technology does not use plastic material and biodegradable material for producing a healthcare product. Moreover, current technology does not use the biodegradable material that is derived from plants. A healthcare product made of biodegradable material derived from plants would be beneficial to the environment.

Therefore, there is a need for a method of manufacturing a biodegradable healthcare product that may overcome one or more of the above-mentioned problems and/or limitations. Ingredients such as potato starch, corn starch, and avocado seeds are grinded and mixed into a biodegradable powder. The biodegradable powder is melted to be used for an injection-molding process to produce the healthcare product. The healthcare product can be any type of healthcare product such as, but not limited to, a pharmaceutical product bottle, a nutraceutical product bottle, a one test kit container, a band-aid container, a dental floss container, a swab container, a syringe, an inhaler, a dropper, or a tampon.

SUMMARY OF THE INVENTION

This summary is provided to introduce a selection of concepts in a simplified form, that are further described below in the Detailed Descriptions of the Invention. This summary is not intended to identify key features or essential features of the claimed subject matter. Nor is this summary intended to be used to limit the claimed subject matter's scope.

According to some embodiments, biodegradable material for producing a healthcare product is disclosed. Further, the biodegradable material may include at least one plant material. Further, the at least one plant material may be derived from at least one plant. Further, the healthcare product may be produced using the biodegradable material based on at least one process. Further, the at least one plant material may be ground into plant material particles. Further, the biodegradable material may include the plant material particles. Further, the at least one process may use the biodegradable material for producing the healthcare product.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

DETAIL DESCRIPTIONS OF THE INVENTION

All illustrations of the drawings are for the purpose of describing selected versions of the present invention and are not intended to limit the scope of the present invention.

Figure 1:
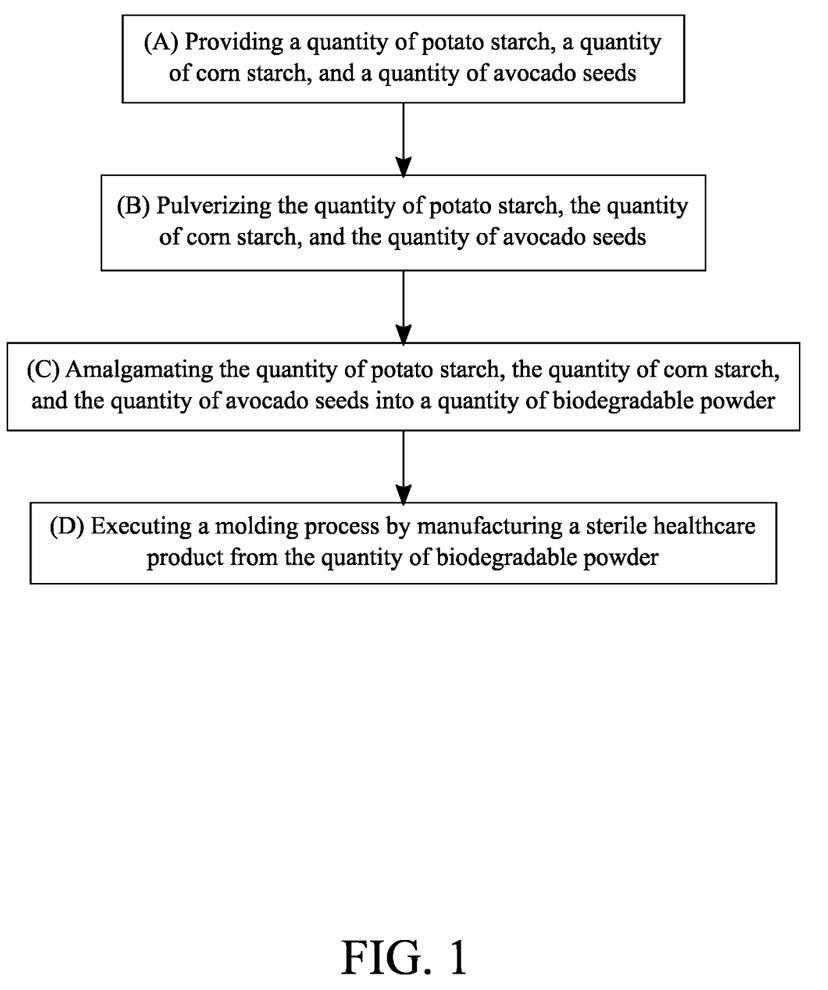
FIG. 1 is a flowchart illustrating the overall process for the method of the present invention.
Figure 8:
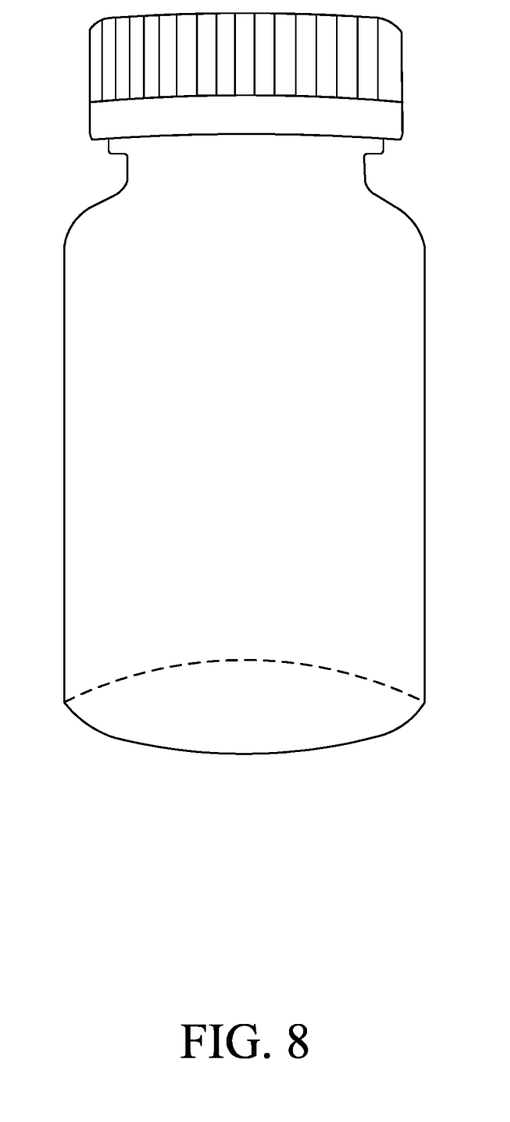
FIG. 8 is a perspective view of one embodiment for the sterile healthcare product.
Figure 9:
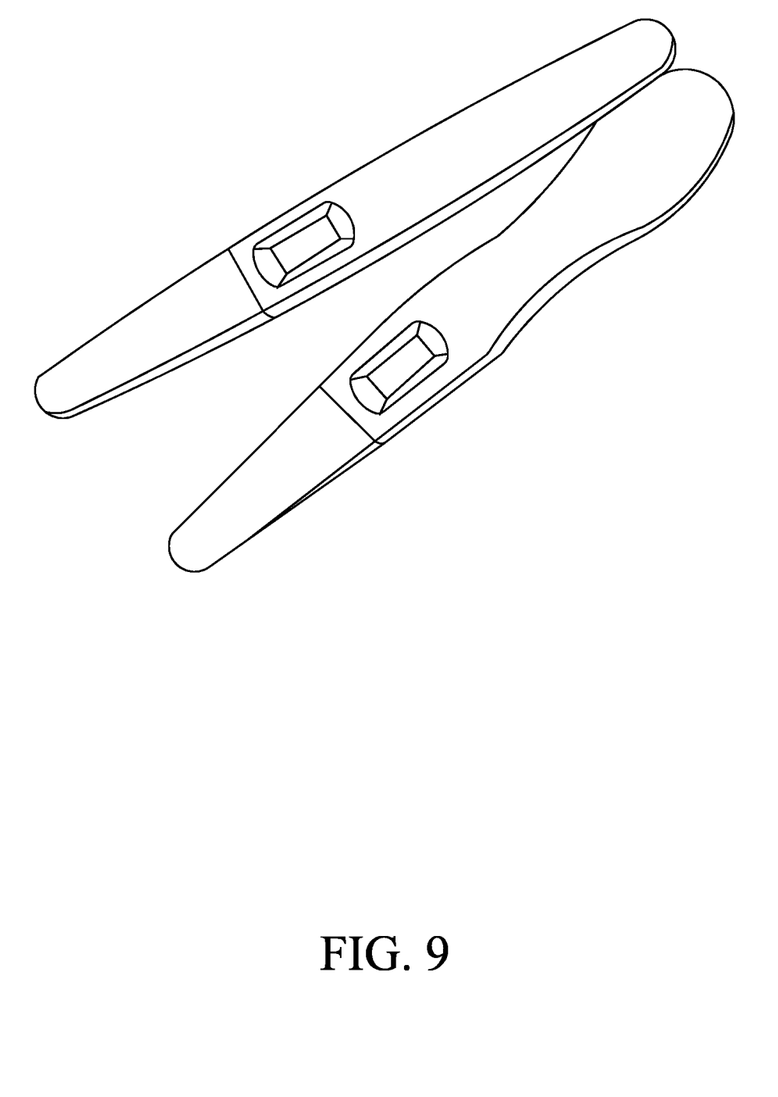
FIG. 9 is a perspective view of another embodiment for the sterile healthcare product.
Figure 10:
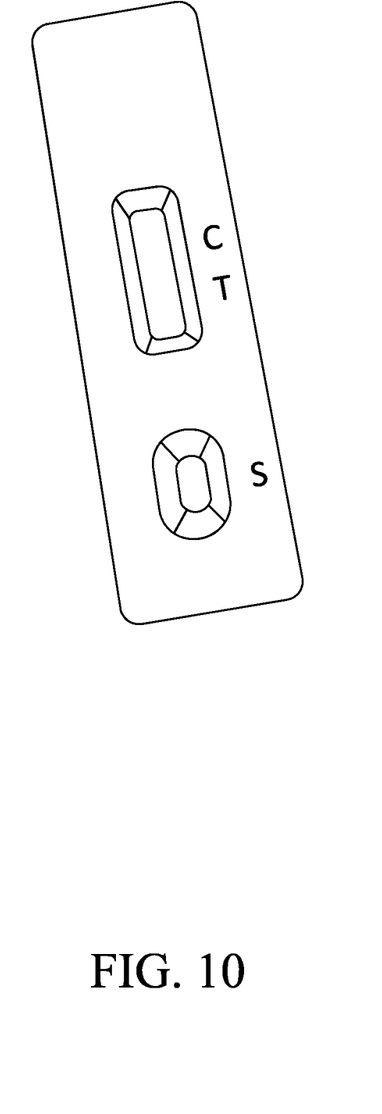
FIG. 10 is a perspective view of another embodiment for the sterile healthcare product.

In reference to FIGS. 1 through 7, the present invention is a method of manufacturing a biodegradable healthcare product for environmental purposes such as reducing waste. With reference to FIG. 1, the main ingredients include a quantity of potato starch, a quantity of corn starch, and a quantity of avocado seeds (Step A). The quantity of potato starch and the quantity of corn starch form the structural base for a biodegradable plastic composition while the quantity of avocado seeds is used to stiffen up the biodegradable plastic composition. The method of the present invention follows an overall process of manufacturing a biodegradable healthcare product. The quantity of potato starch, the quantity of corn starch, and the quantity of avocado seeds are all pulverized (Step B). In more detail, the quantity of potato starch, the quantity of corn starch, and the quantity of avocado seeds are pulverized into a powder form in preparation to mix all the ingredients together. Preferably, a mortar and pestle are used to pulverize the quantity of potato starch, the quantity of corn starch, and the quantity of avocado seeds. The quantity of potato starch, the quantity of corn starch, and the quantity of avocado seeds are amalgamated into a quantity of biodegradable powder (Step C). The quantity of biodegradable powder is the main ingredient for the biodegradable healthcare product. A molding process is executed by manufacturing a sterile healthcare product from the quantity of biodegradable powder (Step D). The molding process may be any type of molding process such as, but not limited to, a liquid injection molding process, or a compression molding process. With reference to FIGS. 8 through 10, the sterile healthcare product can be any type of healthcare product such as, but not limited to, a pharmaceutical product bottle, a nutraceutical product bottle, a one test kit container, a band-aid container, a dental floss container, a swab container, a syringe, an inhaler, a dropper, or a tampon.

Figure 2:
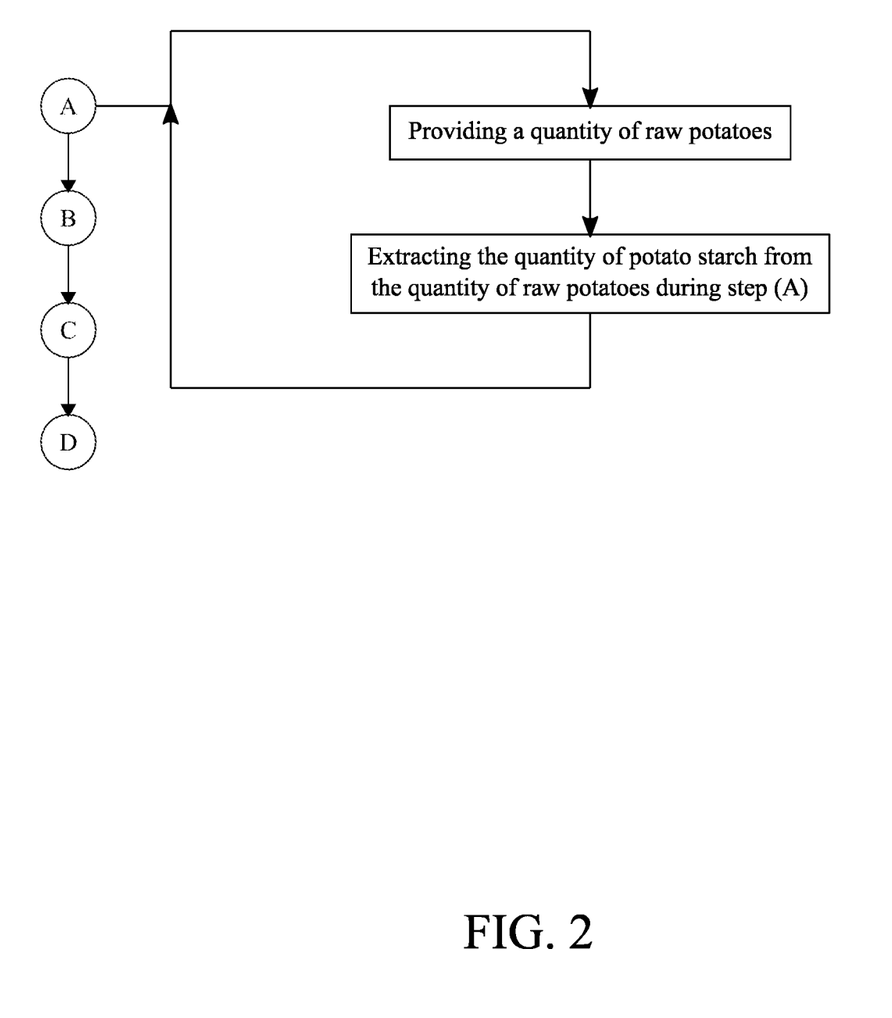
FIG. 2 is a flowchart illustrating the subprocess of obtaining the potato starch.
Figure 3:
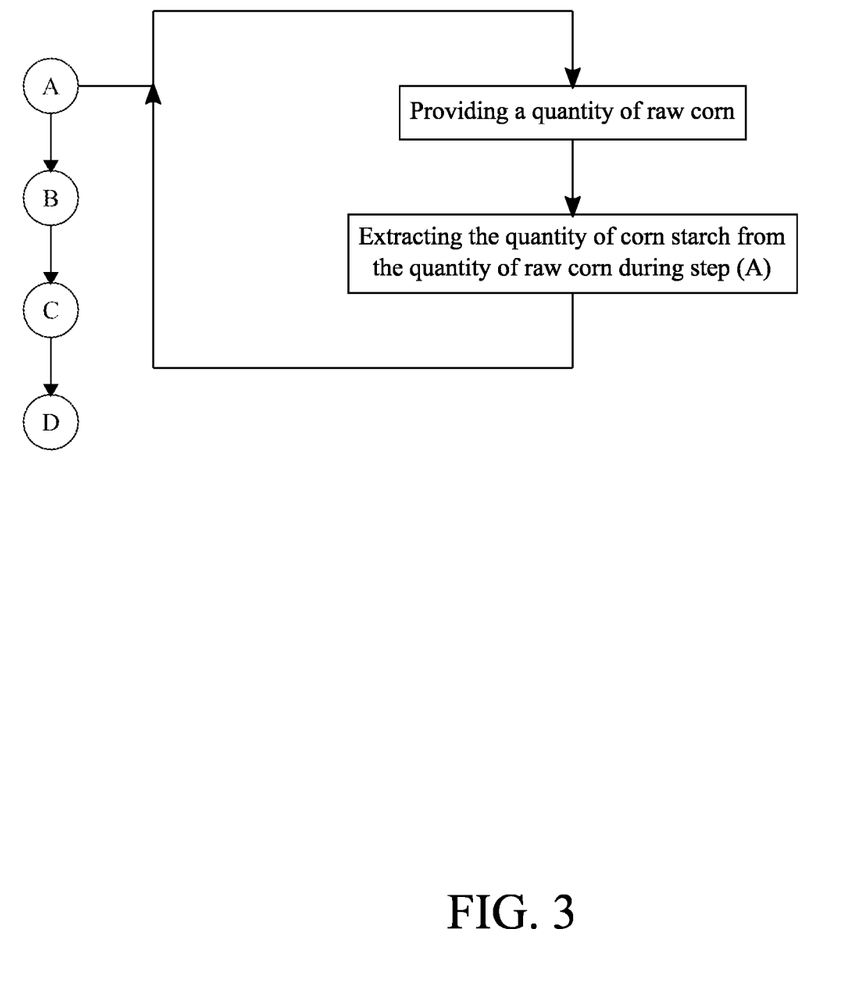
FIG. 3 is a flowchart illustrating the subprocess of obtaining the corn starch.

In order to obtain the quantity of potato starch and with reference to FIG. 2, the following subprocess is executed. A quantity of raw potatoes is provided. The quantity of potato starch is extracted from the quantity of raw potatoes during Step A. In more detail, the quantity of potato starch is extracted through conventional methods where the quantity of raw potatoes is grated. Similarly, in order to obtain the quantity of corn starch and with reference to FIG. 3, the following subprocess is executed. A quantity of raw corn is provided. The quantity of corn starch is extracted from the quantity of raw corn during Step A. In more detail, the quantity of corn starch is extracted through conventional methods where the quantity of raw corn is processed through a blender.

In order for the quantity of potato starch to be mixed into the quantity of biodegradable powder, the quantity of potato starch is pulverized into a particle size equal to or less than 1 millimeter (mm) during Step B. Thus, the quantity of potato starch is pulverized into particles small enough that allow the quantity of potato starch to be mixed into the biodegradable powder. Similarly and in order for the quantity of corn starch to be mixed into the quantity of biodegradable powder, the quantity of corn starch is pulverized into a particle size equal to or less than 1 millimeter (mm) during Step B. Thus, the quantity of corn starch is pulverized into particles small enough that allow the quantity of corn starch to be mixed into the biodegradable powder. Similar to the quantity of potato starch and quantity of corn starch and in order for the quantity of avocado seeds to be mixed into the quantity of biodegradable powder, the quantity of avocado seeds is pulverized into a particle size equal to or less than 1 millimeter (mm) during Step B. Thus, the quantity of avocado seeds is pulverized into particles small enough that allow the quantity of avocado seeds to be mixed into the biodegradable powder.

Figure 4:
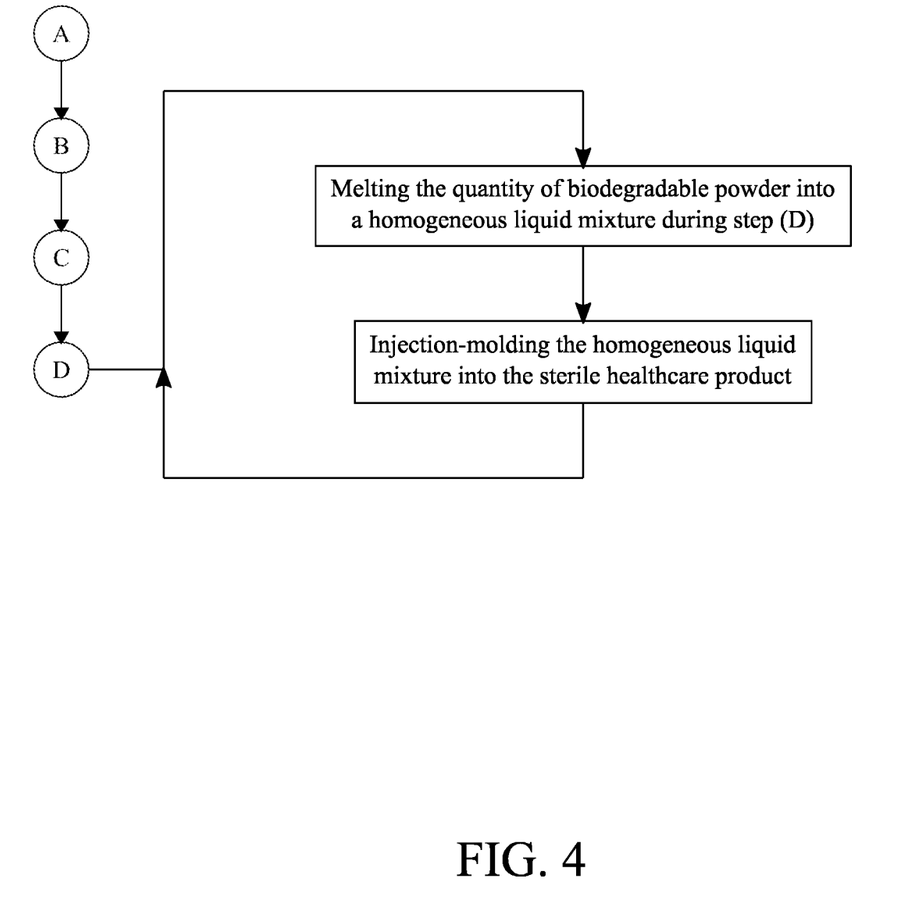
FIG. 4 is a flowchart illustrating the subprocess of melting the biodegradable powder for the injection-molding process.

In order to prepare the quantity of biodegradable powder to undergo the molding process and with reference to FIG. 4, the quantity of biodegradable powder is amalgamated into a heterogeneous mixture from the quantity of potato starch, the quantity of corn starch, and the quantity of avocado seeds during Step C. It is a heterogeneous mixture due to the quantity of potato starch, the quantity of corn starch, and the quantity of avocado seeds each being distinguishable in the biodegradable powder. In order for the heterogenous mixture to become a homogenous mixture, the quantity of biodegradable powder is melted into a homogeneous liquid mixture during Step D. This is done by processing the quantity of biodegradable powder through a liquid injection molding machine or by heating the quantity of biodegradable powder using a separate heat-transfer device. The homogenous liquid mixture is then injection-molded into the sterile healthcare product.

Figure 5:
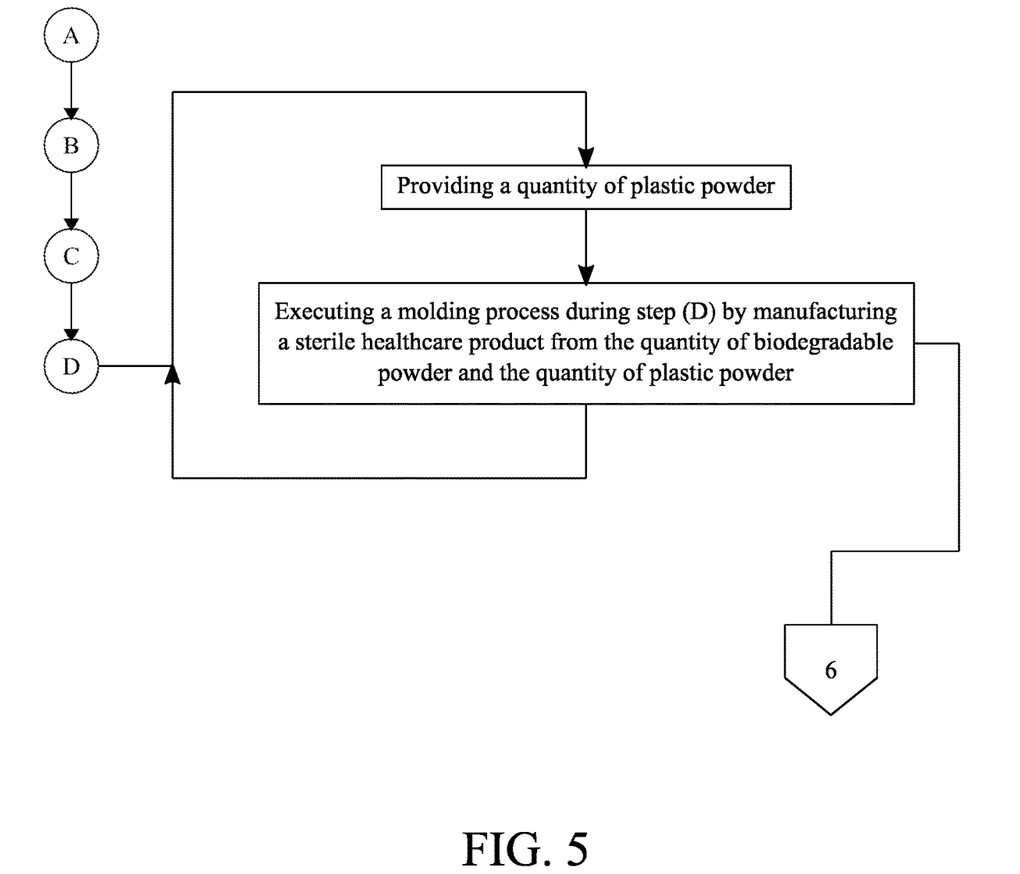
FIG. 5 is a flowchart illustrating the subprocess of using plastic powder with the biodegradable powder to make the sterile healthcare product.
Figure 6:
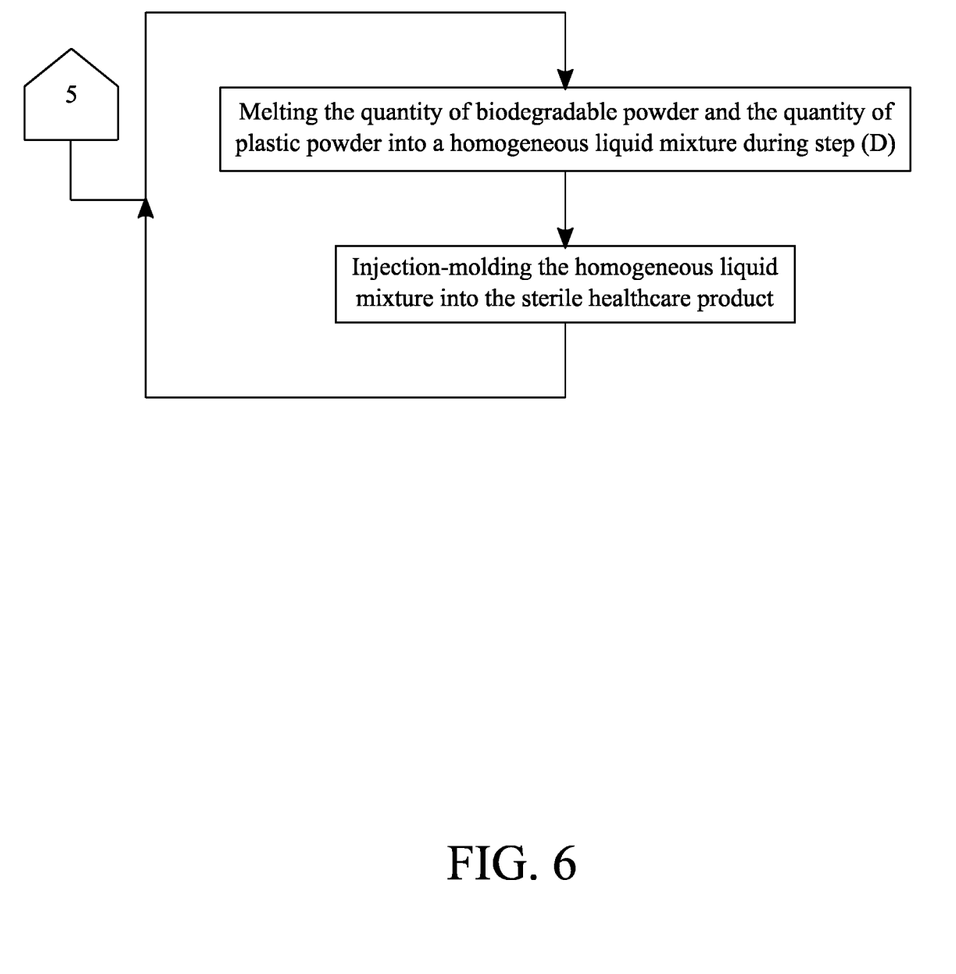
FIG. 6 is a flowchart illustrating the subprocess of melting the biodegradable powder and the plastic powder for the injection-molding process.

In order to manufacture a stiffer sterile healthcare product and with reference to FIG. 5, the following subprocess is executed. A quantity of plastic power is provided.

The plastic powder may be any plastic material selected from group consisting of polyethylene terephthalate, high-density polyethylene, polyvinyl chloride, low-density polyethylene, polypropylene, and polystyrene. A molding process is executed during Step D by manufacturing a sterile healthcare product from the quantity of biodegradable powder and the quantity of plastic powder. Thus, a stiffer sterile healthcare product can be manufactured. In order to prepare the quantity of biodegradable powder and the quantity of plastic powder to undergo the molding process and with reference to FIG. 6, the following subprocess is executed. The quantity of biodegradable powder and the quantity of plastic powder is melted into a homogenous liquid mixture during Step D. This is done by processing the quantity of biodegradable powder and the quantity of plastic powder through a liquid injection molding machine or by heating the quantity of biodegradable powder and the quantity of plastic powder using a separate heat-transfer device. The homogenous liquid mixture is then injection-molded into a stiffer sterile healthcare product. In order to ensure that the stiffer sterile healthcare product is still biodegradable, at least 70 percentage by weight (wt. %) of the sterile healthcare product is made from the quantity of biodegradable powder and at most 30 wt. % of the sterile healthcare product is made from the quantity of plastic powder.

Figure 7:
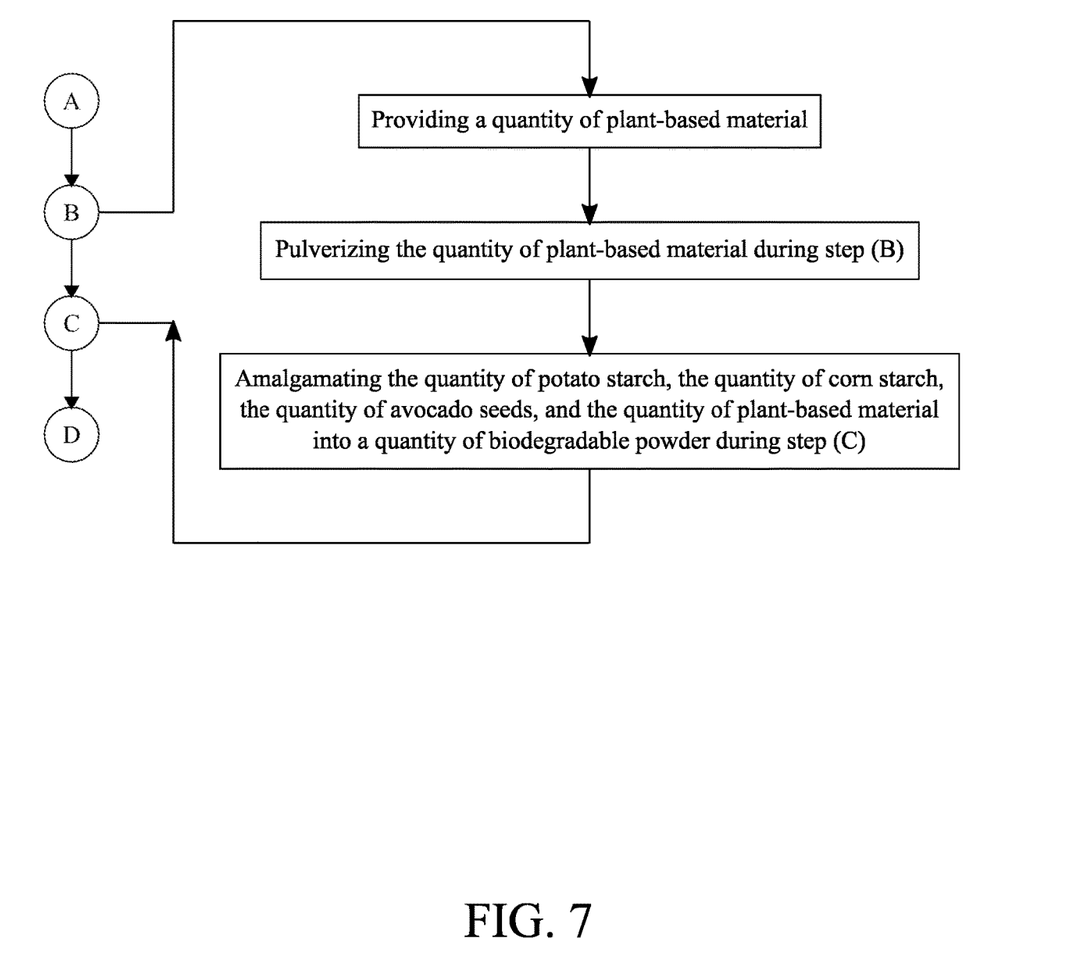
FIG. 7 is a flowchart illustrating the subprocess of using the quantity potato starch, the quantity of corn starch, the quantity of avocado seeds, and the quantity of plant-based material to make the biodegradable powder.

In order to make a quantity of biodegradable powder with a different composition and with reference to FIG. 7, the following subprocess is executed. A quantity of plant-based material is provided. The quantity of plant-based material may be from any type of plant that can be used to make a plastic such as, but not limited to, rice, sugarcane, jackfruit, or another fruit or vegetable. The quantity of plant-based material is pulverized during Step B. In more detail, the quantity of plant-based material is pulverized in preparation to be mixed with the quantity of potato starch, the quantity of corn starch, and the quantity of avocado seeds. Preferably, a mortar and pestle are used to pulverize the quantity of plant-based material. The quantity of potato starch, the quantity of corn starch, the quantity of avocado seeds, and the quantity of plant-based material are amalgamated into a quantity of biodegradable powder during Step C. Thus, the biodegradable powder is made with a different composition. Additionally and similarly to the quantity of potato starch, the quantity of corn starch, and the quantity of avocado seeds and in order for the quantity of plant-based material to be mixed into the quantity of biodegradable powder, the quantity of plant-based material is pulverized into a particle size equal to or less than 1 millimeter (mm) during Step B. Thus, the quantity of plant-based material is pulverized into particles small enough that allow the quantity of plant-based material to be mixed into the biodegradable powder.

Although the invention has been explained in relation to its preferred embodiment, it is to be understood that many other possible modifications and variations can be made without departing from the spirit and scope of the invention as hereinafter claimed.

What is claimed is:

1. A method of manufacturing a biodegradable healthcare product, the method comprising the steps of:
   (A) providing a quantity of potato starch, a quantity of corn starch, and a quantity of avocado seeds;
   (B) pulverizing the quantity of potato starch, the quantity of corn starch, and the quantity of avocado seeds;
   (C) amalgamating the quantity of potato starch, the quantity of corn starch, and the quantity of avocado seeds into a quantity of biodegradable powder; and
   (D) executing a molding process by manufacturing a sterile healthcare product from the quantity of biodegradable powder.

2. The method of manufacturing a biodegradable healthcare product, the method as claimed in claim 1 comprising the steps of:
   providing a quantity of raw potatoes; and
   extracting the quantity of potato starch from the quantity of raw potatoes during step (A).

3. The method of manufacturing a biodegradable healthcare product, the method as claimed in claim 1 comprising the steps of:
providing a quantity of raw corn; and
extracting the quantity of corn starch from the quantity of raw corn during step (A).

4. The method of manufacturing a biodegradable healthcare product, the method as claimed in claim 1, wherein the quantity of potato starch is pulverized into a particle size equal to or less than 1 millimeter (mm) during step (B).

5. The method of manufacturing a biodegradable healthcare product, the method as claimed in claim 1, wherein the quantity of corn starch is pulverized into a particle size equal to or less than 1 mm during step (B).

6. The method of manufacturing a biodegradable healthcare product, the method as claimed in claim 1, wherein the quantity of avocado seeds is pulverized into a particle size equal to or less than 1 mm during step (B).

7. The method of manufacturing a biodegradable healthcare product, the method as claimed in claim 1, wherein the quantity of biodegradable powder is amalgamated into a heterogeneous mixture from the quantity of potato starch, the quantity of corn starch, and the quantity of avocado seeds during step (C).

8. The method of manufacturing a biodegradable healthcare product, the method as claimed in claim 1 comprising the steps of:
melting the quantity of biodegradable powder into a homogeneous liquid mixture during step (D); and
injection-molding the homogeneous liquid mixture into the sterile healthcare product.

9. The method of manufacturing a biodegradable healthcare product, the method as claimed in claim 1 comprising the steps of:
providing a quantity of plastic powder; and
executing a molding process during step (D) by manufacturing a sterile healthcare product from the quantity of biodegradable powder and the quantity of plastic powder.

10. The method of manufacturing a biodegradable healthcare product, the method as claimed in claim 9 comprising the steps of:
melting the quantity of biodegradable powder and the quantity of plastic powder into a homogeneous liquid mixture during step (D); and
injection-molding the homogeneous liquid mixture into the sterile healthcare product.

11. The method of manufacturing a biodegradable healthcare product, the method as claimed in claim 9, wherein the quantity of biodegradable powder is at least 70 percentage by weight (wt. %) of the sterile healthcare product.

12. The method of manufacturing a biodegradable healthcare product, the method as claimed in claim 9, wherein the quantity of plastic powder is at most 30 wt. % of the sterile healthcare product.

13. The method of manufacturing a biodegradable healthcare product, the method as claimed in claim 9, wherein the quantity of plastic powder is a material selected from the group consisting of: polyethylene terephthalate, high-density polyethylene, polyvinyl chloride, low-density polyethylene, polypropylene, and polystyrene.

14. The method of manufacturing a biodegradable healthcare product, the method as claimed in claim 1, the method comprises the steps of:
providing a quantity of plant-based material;
pulverizing the quantity of plant-based material during step (B); and
amalgamating the quantity of potato starch, the quantity of corn starch, the quantity of avocado seeds, and the quantity of plant-based material into a quantity of biodegradable powder during step (C).

15. The method of manufacturing a biodegradable healthcare product, the method as claimed in claim 14, wherein the quantity of plant-based material is pulverized into a particle size equal to or less than 1 mm during step (B).

* * * * *